DONALD K. CROCKETT,
GEORGE MUINCH,
INVENTORS

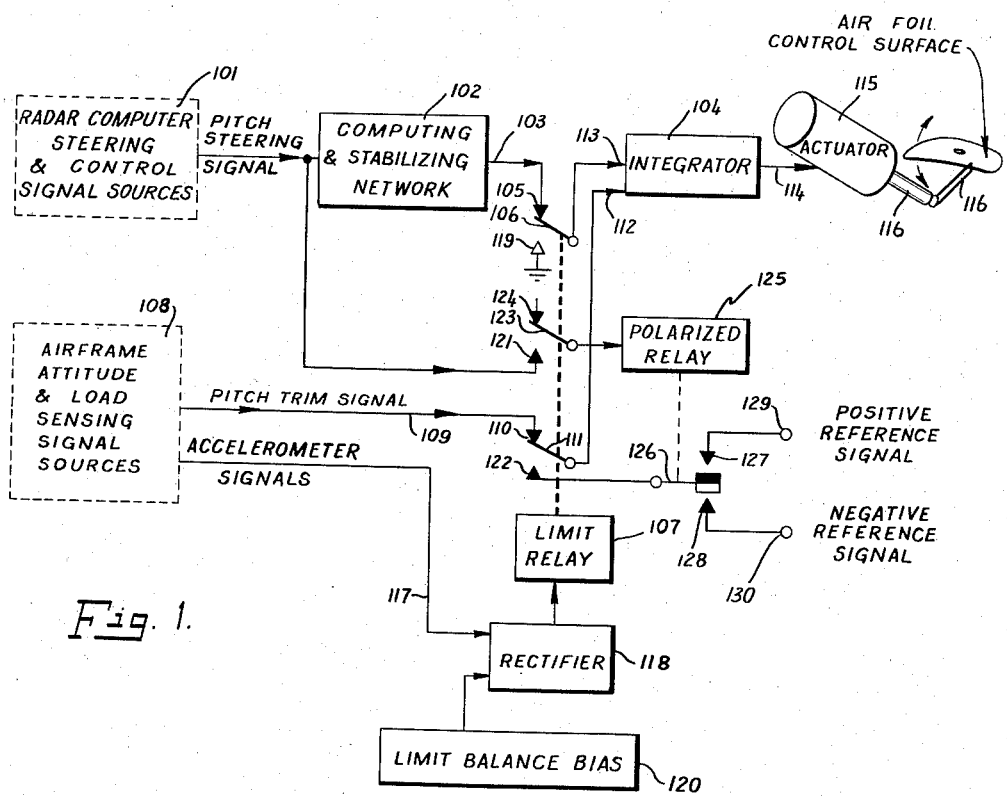
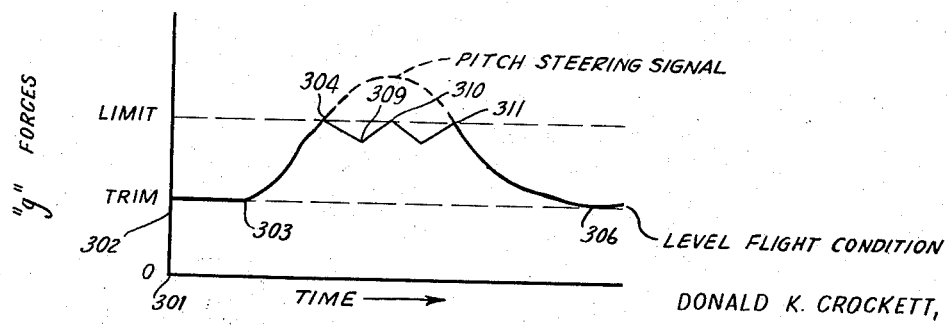
Fig. 1.
Fig. 3.
DONALD K. CROCKETT,
GEORGE MUINCH,
INVENTORS.
BY Henry Heyman
ATTORNEY

BY Henry Heyman
ATTORNEY

United States Patent Office 2,869,804
Patented Jan. 20, 1959

2,869,804

ACCELERATION RESPONSIVE CONTROL SURFACE CONTROL LIMITING SYSTEM FOR AIRCRAFT

George Muinch, Northridge, and Donald K. Crockett, Torrance, Calif., assignors to Hughes Aircraft Company, Culver City, Calif., a corporation of Delaware Application July 26, 1955, Serial No. 524,412

4 Claims. (Cl. 244—77)

This invention relates to acceleration limiting devices and in particular to an electronic means for limiting the operation of automatic aircraft control surface controlling devices to prevent excessive acceleration stresses upon the operating personnel and on the aircraft.

In an aircraft that is stabilized by signals from various automatic sensing instruments responding to varying aerodynamic and flight conditions it is necessary to apply acceleration limiting devices to prevent excessive acceleration loads in the normal (lift) direction. That is, the direction perpendicular to the lift surfaces of the aircraft. The permissible values of acceleration are dictated by structural limitations of the aircraft, aerodynamic factors, such as air density and air speed, or by considerations of operating personnel comfort.

Lift force in aircraft is controlled through the motion of the pitch control surfaces, e. g. elevators, stabilizers, or elevons. Safe conditions can be maintained by arresting the motion of these control surfaces when accelerometers indicate that a maximum safe acceleration load limit has been reached. At this point the operation of the automatic system is interrupted. Means must therefore be provided to detect accelerations in the lift direction during the interruption so that normal operation may be resumed or, alternatively to provide signals for further acceleration limiting operation if necessary when the emergency is passed. It is furthermore necessary to provide for a maximum acceleration responsive limiting action to occur in the control of the aircraft without sudden and violent changes in acceleration or acceleration direction which might result from too rapid changes in control surface positions.

A term commonly used for devices which limit control surface movements in the manner above described is "g-limiting devices" or "g-limit switches." Such conventional devices, normally arrest the operation of the control surfaces when the acceleration limit is reached. This may result in too abrupt changes in the control surface action, an undesirable condition at best.

In the present invention a pitch steering control signal of a conventional type is applied to an integrator through the contacts of a limit relay. The integrator normally processes the control signal to develop command signals for the aircraft control surface actuators to position the elevon or other control surfaces. By the operation of the circuits of this invention the control surfaces are not permitted to move through any angle which would result in an acceleration that could cause a lift force perpendicular to the lift surfaces in excess of a safe limit for the airframe construction, or personnel comfort, whichever is the smaller value, or prevalent aerodynamic conditions which might otherwise induce loss of control.

Thus, if the acceleration as indicated by an accelerometer connected to indicate the magnitude of lift force on the wing becomes large enough as established by the predetermined limits, a limiting relay is actuated in response to this value of acceleration by which the abovementioned integrator is disconnected from the computing and stabilizing network and in place of the network signals, reference control signals are applied to the integrator which gradually reduce the value of applied acceleration signals until the accelerometer indicates that the airframe is no longer at the limiting value of acceleration or lift force at which point the limit relay is deenergized and normal control signals are applied.

Accordingly, it is an object of this invention to provide a limiting relay circuit responsive to accelerometer signals to disconnect automatic steering control circuits to prevent the control action from operation at any rate such as to strain the airframe or constitute a hazard to personnel comfort or to induce loss of control.

It is a further object of this invention to provide a relay limiting device for automatic aircraft control surface controls which is adjustable in range of operation in accordance with prevailing flight conditions of air speed and air density.

It is yet another object of this invention to provide an automatic limit relay circuit for aircraft control surface control circuits which substitutes predetermined fixed reference signals for dynamic control signals when a predetermined lift acceleration load limit has been reached, and returns to automatic dynamic control when the danger of excess acceleration loads has passed.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only, and are not intended as a definition of the limits of the invention.

Fig. 1 is a block diagram of the circuit of this invention.

Fig. 3 is a waveform diagram of the operation of this invention.

Figure 2:
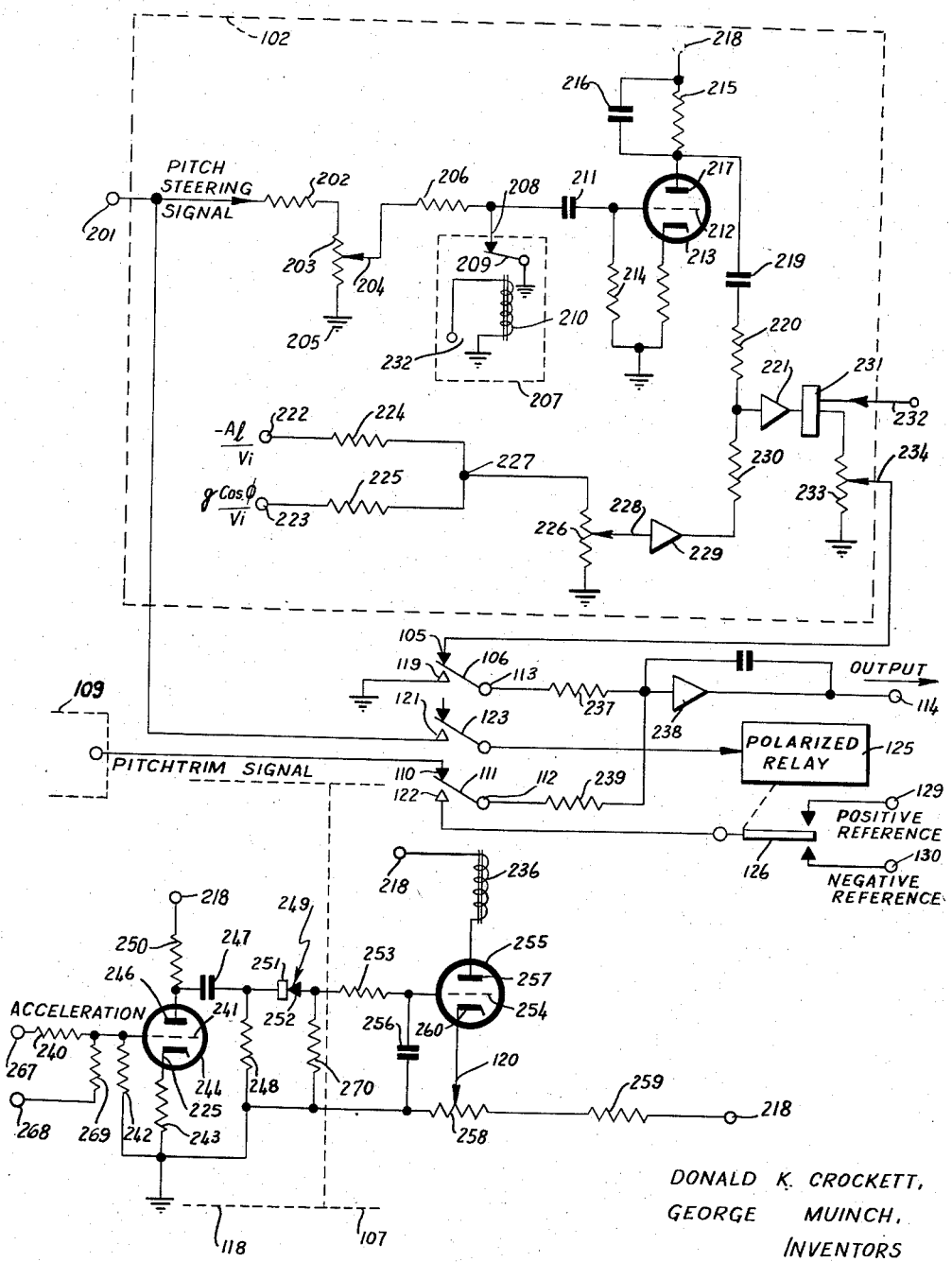
Fig. 2 is a simplified schematic diagram of typical circuits operating in conjunction with the limit relay control circuit of this invention.

Referring now to Fig. 1 in which there is shown a block diagram of the acceleration responsive control surface control limiting system of this invention, block 101 is a source of control signals such as may be generated in an aircraft radar set which may incorporate a fire control system. One of the output signals of such a system is a pitch steering signal in the form of a D.-C. voltage which varies in accordance with an error representative of the difference between the present flight attitude of the aircraft and a flight attitude required in connection with some predetermined maneuver or fire control problem. The pitch steering signal is applied to a computing and stabilizing network 102 which is described in further detail below. The network 102 generates a corrected D.-C. pitch steering control signal which takes into account, lift, acceleration, gravity and other aerodynamic factors such as forward velocity and the turning angle over which the controls operate. The corrected pitch steering control signal appears at 103 from whence it is applied to input terminals 113 of an integrator 104 through a normally closed contact 105 and an associated armature 106 of a limit relay circuit 107. There is also applied to another input 112 of integrator 104 a D.-C. pitch trim signal derived from the aircraft controls 108 along line 109 through a normally closed contact 110 and an associated armature 111 of relay 107. The integrated pitch steering command signal output at 114 of integrator 104 is applied to a control actuator 115 for control elements 116. A.-C. accelerometer signals derived from accelerometers in the aircraft controls 108 is applied as shown along line 117 to a rectifier circuit 118. Rectifier circuit 118 is connected to limit relay circuit 107. From a source of bias potential shown at 120, a limit range bias potential is applied to limit relay circuit 107.

Pitch steering signals from source 101 are also applied to the normally open contact 121 associated with armature 123 of limit relay circuit 107. The normally closed contact 124 of relay circuit 107 has no connection. Armature 123 is connected to a polarized relay 125 which is mechanically linked to an armature 126 of polarized relay 125. Contact 127 of polarized relay 125, associated with arm 126 is connected to a source of positive reference potential at 129. Contact 128 of polarized relay 125 is connected to a terminal 130 which may be in turn connected to a source of negative reference potential not shown. Arm 126 is connected to normally open contact 122 associated with arm 111 of relay circuit 107.

In Fig. 2, to which reference is now made, a simplified schematic diagram is shown of circuit details of the acceleration responsive control surface control limiting system of this invention. In block 102, shown dashed in Fig. 2 and corresponding to the like identified block of Fig. 1, a D.-C. signal is applied at input terminals 201. The D.-C. signals are derived, as described above, from the pitch steering signal generating source in a radar fire control set such as 101 of Fig. 1. A resistor 202 and a potentiometer 203 are connected in series across the input terminals 201. Potentiometer 203 has one end connected to a ground terminal 205 and resistor 202 has one end connected to the high side of input terminals 201. Arm 204 of potentiometer 203 provides an output signal take off point whereby an attenuated portion of the signal applied at terminals 201 may be developed. This attenuated D.-C. signal is applied through an isolating resistor 206 to chopper 207. Chopper 207 alternately short circuits the signal to ground through its contact terminals 208 and 209 when these contact terminals are excited by coil 210 which is energized by a source 232 of alternating current at some predetermined frequency. The resulting A.-C. signal is applied from the chopper 207 through coupling capacitor 211 to the grid 212 of an amplifier 213. A grid leak resistor 214 is connected between grid 212 and ground. A resistor 215 and capacitor 216 are connected parallel to each other between the anode 217 of amplifier 213 and a source of B+ voltage at 218. Resistor 215 is an anode load for, and capacitor 216 a by-pass capacitor to reduce high frequency operation of the amplifier 213. Through a capacitor 219 and resistor 220, connected in series, the amplified A.-C. signal developed at the anode 217 of amplifier 213 is applied to a cathode follower amplifier 221.

An A.-C. signal representing the ratio of lift acceleration to forward velocity of the aircraft is applied to an input terminal 222. This signal designated as $-Al/Vi$ has a negative phase relationship with respect to an A.-C. signal representing the gravitational force in terms of a roll or turning rate with respect to the forward velocity of the aircraft. This latter signal, $+g \cos \phi/Vi$, is applied to an input terminal 223. These signals are added algebraically through isolation resistors 224 and 225 in an attenuator 226 connected between a junction 227 of resistors 224 and 225 and ground. From adjustable arm 228 of attenuator 226 a selected attenuated portion of the algebraically combined signal $$[-(Ae/Vi)+(g \cos \phi/Vi)]K$$

is applied to a cathode follower amplifier 229. Through isolation resistor 230 the output signal of cathode follower 229 is applied to cathode follower 221 along with the A.-C. signal counterpart of the pitch steering signal from amplifier 213.

The combined signals which are developed in cathode follower amplifier 221 are applied to a phase detector 231. A reference signal from a source 232 is applied to phase detector 231 also. The reference signal from source 232 is the same as is used to excite coil 210 of chopper 207. The resultant output signal from phase detector 231 is a varying D.-C. voltage which is called corrected pitch steering control signal and is the pitch steering signal, now corrected for aircraft forward velocity, gravity, lift acceleration, and roll angle. This corrected pitch steering signal is applied across an attenuator 233 connected between the output of phase detector 231 and ground. An attenuated portion of the output of detector 231 at adjustable arm 234 of attenuator 233 is connected through the contact and arm terminals 105 and 106 of a relay 236. Relay 236, further described below, is part of limit relay circuit 107 shown in a dashed box of Fig. 2 and corresponds to the identically numbered block of Fig. 1. The signal now appearing at arm 106 of relay 236 is applied to input terminal 113 of integrator 104 (see Fig. 1). An isolation resistor 237 is provided at the input of integrator amplifier 238, and is connected between amplifier 238 and input 113. Input circuit 112 of integrator 104 (Fig. 1) has previously been described and can be also seen to be connected through contacts 110 and 111 of relay 236 to a generator of pitch trim signals in source 108 (Fig. 1). The pitch trim signal is a D.-C. signal now appearing at arm 111 of relay 236 and at input 112 of integrator 104. An isolation resistor 239 is connected between the input of integrating amplifier 238 and terminal 112. The corrected pitch steering control signal and the pitch trim signal are both applied to the integrating amplifier 238 which generates a resulting pitch steering command signal corresponding to the integral of the algebraic sum of the pitch trim signal applied at terminal 112 of integrator 104 and the corrected pitch steering control signal applied at terminal 113 of integrator 104. This integral signal appears at integrator output terminal 114. The integrated signal is applied to control actuator 115 (Fig. 1) as previously described.

In Fig. 2 dashed block 118 corresponds to the like identified block 118 of Fig. 1 called a rectifier. Within block 118 are included accelerometer signal inputs 267 and 268 which may be connected to sources of accelerometer signals such as previously referred to as generated in aircraft controls in block 108 of Fig. 1. Accelerometer output signals are A.-C. signals of varying amplitudes. Such signals applied to input 267 and 268 through the respective isolation resistors 240 or 269 appear on the grid 241 of amplifier 244. Resistor 242 connected between grid 241 and ground is a grid leak for amplifier 244.

Resistor 250 is an anode load resistor connected between anode 246 of amplifier 244 and a source of B+ potential 218. From anode 246 to the anode terminal 251 of a rectifier diode device 249 a coupling capacitor 247 is connected. An input load resistor 248 is connected between anode 251 of rectifier 249 and ground. An output load resistor 270 is connected between the cathode terminal 252 of rectifier 249 and ground, a series isolation resistor 253 is connected between cathode 252 and the grid 254 of a relay control tube 255 and a grid charging capacitor 256 is connected between grid 254 and ground. The coil of relay 236 is connected between anode 257 of control tube 255 and a source of B+ potential at 218. A voltage divider network comprising series connected variable resistor 258 and fixed resistor 259 is connected between B+ terminal 218 and ground. Cathode 260 of relay control tube 255 is connected to variable arm 120 of variable resistor 258. The reference character 120 shown in Fig. 1 is a source of limit range balance bias.

Referring now to Fig. 3 there is shown a waveform diagram illustrating the control operation of this invention. In the diagram a horizontal line 301 represents a level flight condition, at which the acceleration in the lift direction is zero. The scale 302 at left is indicative of gravity, identified in Fig. 3 as "g" force. An illustrative normal operating condition of lift acceleration is shown by the horizontal line 303 as the control surfaces may be trimmed for a particular flight operation. In a particular maneuver the lift acceleration value may rise as at 304 to the maximum permissible value, whereupon the limit relay circuit 107 (Fig. 1) is actuated and the normal control signal (corrected pitch steering signal) is removed from integrator 104 by the operation of the contacts 105 and 106 in relay circuit 107. In place of the normal control signal referenced against the pitch trim signal being applied to integrator 104, as previously described, the uncorrected pitch steering signal is now applied to polarized relay 125 causing positive or negative reference signals to be applied to the integrator 104 which brings the control surface action down gradually as shown in Fig. 3 to point 309. At point 309 the accelerometer signal has decreased because of decreased acceleration until limit relay 107 is deenergized. Thus the control surface action curve rises again in response to the positive or negative reference signals to the limit at point 310. This action continues until the corrected pitch steering signal starts to fall below the limit as at point 311. The pitch steering signal falls, for example, when the command is for the aircraft to fly toward a horizontal pitch. The control surface action curve then falls from the limit level to the level flight condition, closely following the pitch steering signal. The frequency of the "sawtooth" variation as the control varies from point 304 to point 309 and point 310 on the curve of Fig. 3 is determined by the magnitude of the positive and negative safe reference potentials applied at 129 and 130 respectively (see Fig. 1).

To recapitulate the operation of this invention it is assumed that the aircraft is operating under a normal set of conditions as represented at 303 in Fig. 3. At this time signals from stabilizing network 102 are being applied to integrator 104 at input 113 along with pitch trim signals at input 112. In response to signal commands from the radar system a flight path change is required. The computing and stabilizing network 102 processes these pitch steering control signals through integrator 104, as previously described, to operate the control surface actuator 115. As a result the lift acceleration may rise to an unsafe level, at this point the circuits of this invention begin to operate. A signal from the lift accelerometer is processed by rectifier 118 (Fig. 1) to generate a D.-C. voltage of an amplitude determined by the lift acceleration condition. Rectifier 118 includes an amplifier 244 and rectifier 249 as shown in Fig. 2 and the D.-C. voltage developed thereby appears across capacitor 256 as a grid signal for relay control tube 255. The cathode 260 of control tube 255 is set at a predetermined level on control 258 as required by the known safe limit conditions. The voltage which charges capacitor 256 is positive on the grid 254 of control tube 255 with respect to ground. As a result of the positioning of control 258, grid 254 is normally negative with respect to cathode 260 and tube 255 is not conducting. When the positive charge on capacitor 256 equals the negative bias at grid 254 the tube 255 becomes conductive and relay coil 236 connected in the plate circuit of tube 255 is energized. Contact arm 111 moves to contact terminal 122; contact arm 123 moves to contact terminal 121 and contact arm 106 moves to contact terminal 119. Thus, input 113 of integrator 104 is grounded and input 112 of integrator 104 is now connected to polarized relay arm 126. Polarized relay 125 which is not energized in the normal operation, now is energized by pitch steering signals from radar set 101, through contacts 121 and 123 of the relay 236.

Integrator 104 now receives either the positive reference signal from source 129 or negative reference signal from source 130, depending on whether or not the pitch steering signal is positive or negative to operate polarized relay 125.

If the pitch steering signal is negative at the time of operation of relay 236, polarized relay 125 is actuated so as to apply positive reference voltage from source 129 to the integrator 104 to reverse the control action of actuator 115 by counteracting the originally negative command signal to the actuator 115 which had brought the lift acceleration value to an unsafe enough level for actuation of the limit relay circuits 107.

On the other hand a positive pitch steering signal at the time of limit control action would result in the application of negative reference voltage from source 130 to integrator 104 to counteract the positive command signal.

Thus as distinguished from conventional g-limit control devices this invention provides a counteracting reference signal to the control integrator which gradually returns the control surfaces to the safer operating condition instead of a sudden arrest of control function which could result in a kind of whip lash effect and lead to destruction of the airframe. By the operation of this invention all control functions are arrested in a manner allowing a smooth return to safer operating conditions at which lift acceleration levels do not endanger either the airframe or its operating personnel.

The details of this invention as described hereinabove may be modified by those skilled in the art to accomplish the same result without departing from the spirit and scope of this invention as defined in the following claims.

What is claimed as new is:

1. An automatic control limiting device for aircraft comprising: control surface actuating means; pitch steering signal means normally connected to said control surface actuating means to automatically operate said actuating means; normally disconnected polarized reference signal means adapted to provide predetermined control signals in response to pitch steering signals; and normally deenergized acceleration signal responsive switching means connected to said control surface actuating means, to said pitch steering signal means, and to said reference signal means, said switching means being energized in response to predetermined values of accleration signals to disconnect said actuating means from said pitch steering signal means and to connect said pitch steering signal means to said polarized reference signal means, and to connect said polarized reference signal means to said actuating means; whereby when said predetermined values of acceleration signals occur said actuating means is disconnected from said pitch steering signal means and connected to said reference signal means to receive selected polarities of said reference signals which are applied to said actuating means in response to signals from said pitch steering signal means, automatic control of said actuating means being thereby arrested for the duration of said predetermined values of said acceleration signals, and reference signal control being substituted.

2. The automatic control limiting device defined in claim 1 wherein said acceleration signal responsive switching means includes an electron discharge relay circuit, means coupled to said relay circuit for applying a predetermined reference bias thereto to maintain said relay circuit normally deenergized, a rectifier coupled to said relay circuit, and an acceleration signal amplifier coupled to said rectifier whereby acceleration signals of predetermined value are developed in said amplifier and are rectified and applied to said relay circuit to render said relay circuit energized.

3. An automatic pitch steering signal control limit system for aircraft comprising: control surface actuating means; a source of pitch steering signals; a source of acceleration and load signals; a computing and stabilizing network coupled to said source of pitch steering signals; normally disconnected reference signal means having selective means responsive to the polarity of the pitch steering signals to provide a selected reference signal; and a normally deenergized limit control means coupled to said source of acceleration and load signals and having interconnected therewith a relay switching device and a safe limit reference bias source, said limit control means being responsive to signals from said source of acceleration and load signals having a value in excess of that corresponding to the limit reference bias to be eenrgized thereby, said relay switching device being connected, in the deenergized condition of said limit control means, between said control surface actuating means and said computing and stabilizing network, and between said control surface actuating means and said source of acceleration and load signals, and said relay switching device being connected in the energized condition of said limit control means between said reference signal means and said source of pitch steering signals and between said control surface actuating means and said reference signal means, whereby said control surface actuating means may be selectively operated by said computing and stabilizing network when the reference bias has not been exceeded by signals from said source of acceleration and load signals, and said control surface actuating means may be operated by signals from said reference signal means when the reference bias is exceeded.

4. The automatic pitch steering signal control limit system for aircraft defined in claim 3 wherein said normally disconnected reference signal means includes a polarized relay operative in response to said pitch steering signals to operate said selective means and coupled to said relay switching device, said selective means is mechanically coupled to said polarized relay and includes a source of positive reference signals and a source of negative reference signals selectively connected to said selective means whereby in said energized condition of said limit control means, said polarized relay is connected to said source of pulse steering signals, and said control surface actuating means is connected to and actuated by a selected one of said reference signals in response to signals from said source of pulse steering signals applied through said relay switching device to said polarized relay.

References Cited in the file of this patent
UNITED STATES PATENTS
2,659,041    Kutzler _____ Nov. 10, 1953